(12) United States Patent
Hecht

(10) Patent No.: US 10,447,727 B1
(45) Date of Patent: Oct. 15, 2019

(54) PREDICTING AND ADDRESSING HARMFUL OR SENSITIVE NETWORK ACTIVITY

(71) Applicant: CyberArk Software Ltd., Petach-Tikva (IL)

(72) Inventor: Asaf Hecht, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/286,890

(22) Filed: Feb. 27, 2019

(51) Int. Cl.
*H04L 29/06* (2006.01)
*G06N 20/00* (2019.01)

(52) U.S. Cl.
CPC ......... *H04L 63/1441* (2013.01); *G06N 20/00* (2019.01)

(58) Field of Classification Search
CPC ..... H04L 63/1441; G06N 20/00; G06N 7/005
See application file for complete search history.

(56) References Cited

U.S. PATENT DOCUMENTS

| | | | | |
|---|---|---|---|---|
| 10,104,100 B1* | 10/2018 | Bogorad | ............ | H04L 63/1425 |
| 2014/0279779 A1* | 9/2014 | Zou | ........................ | G06N 3/08 |
| | | | | 706/25 |
| 2017/0063887 A1* | 3/2017 | Muddu | ................. | G06F 16/254 |
| 2018/0034842 A1* | 2/2018 | Smyth | .................... | G06N 7/005 |
| 2018/0060744 A1* | 3/2018 | Achin | .................... | G06N 20/00 |
| 2018/0248895 A1* | 8/2018 | Watson | ................ | G06N 3/0445 |
| 2018/0248902 A1* | 8/2018 | D Nil -Dumitrescu | ..................... | |
| | | | | G06N 3/02 |

* cited by examiner

*Primary Examiner* — Christopher C Harris
(74) *Attorney, Agent, or Firm* — Finnegan, Henderson, Farabow, Garrett & Dunner, LLP

(57) ABSTRACT

Disclosed embodiments relate to systems and methods for predictable detection in a computing network. Techniques include identifying an activity associated with an identity in the computer network; accessing hierarchical-chained progression states representing timelines defining one or more process flows for operations in the computer network between beginning states and corresponding predictable result states to be controlled; identifying a hierarchical-chained progression state corresponding to the identified activity; automatically predicting a likelihood that the at least one activity will reach the predictable result state corresponding to the identified hierarchical-chained progression state; and implementing a control action for the activity, the identity, or a resource to which the identity is seeking to communicate.

19 Claims, 7 Drawing Sheets

PREDICTING AND ADDRESSING HARMFUL OR SENSITIVE NETWORK ACTIVITY

BACKGROUND

With increasing reliance on distributed computing networks across many industries, attacks on these networks pose a significant threat to companies and other organizations. Malicious attacks may include attempts to access, expose, alter, disable, destroy, or steal an asset or resource on a network. Such attacks can come from outside actors without access to the network, and also from internal rogue actors that have legitimate access. These attacks can cause serious hardships and damage, and are often irreversible. Accordingly, organizations are increasingly looking for solutions to monitor computing networks to detect these actions. This often includes monitoring network traffic and attempting to discern suspicious or malicious activity from normal, permissible activity, which is often difficult, especially when attacks originate from actors that have legitimate access to the network.

Certain solutions have been developed to attempt to detect malicious activity in a network. These technologies are often reactive, only detecting the activity after it has already occurred. For example, some solutions involve analyzing a log of events or actions that have occurred within the network and identifying malicious activities as they are logged. These techniques, however, do not allow prevention of the activity in advance, and thus often fail to prevent damage from occurring. Further, there may be delays associated with logging and monitoring the events, which lead to further delays in responding to the detected activity.

Accordingly, in view of these and other deficiencies in existing techniques, technological solutions are needed for predictably detecting activities in advance of when they occur. Solutions should advantageously allow detection of the activity as early as possible in a process flow leading to the activity. The malicious actions should be detectable based on activities or a combination of activities that alone may not be malicious, such as permissible but suspicious activity by a user. Ideally, a system or organization should be able to take a necessary control action to prevent or mitigate the harmful result. Further, the solutions should allow for different actions to be taken based on how far along the progression of the activity is towards reaching the harmful result.

SUMMARY

The disclosed embodiments describe non-transitory computer readable media, systems, and methods for predicting and addressing harmful or sensitive network activity. For example, in an exemplary embodiment, there may be a non-transitory computer readable medium including instructions that, when executed by at least one processor, cause the at least one processor to perform operations for developing predictions of sensitive states to be controlled in a computer network. The operations may comprise identifying at least one activity associated with an identity in the computer network; accessing a plurality of hierarchical-chained progression states representing timelines defining one or more process flows for operations in the computer network between beginning states and corresponding predictable result states to be controlled; wherein the plurality of hierarchical-chained progression states are: dynamically configurable according to, at least in part, environmental attributes of the computer network, comprised of a plurality of dynamically built constituent phases, and associated with indications of potentially reaching one or more of the corresponding predictable result states; identifying a hierarchical-chained progression state from the plurality of hierarchical-chained progression states corresponding to the identified activity; wherein the identifying is performed independent of any indication of whether the at least one activity has resulted in a predictable result state corresponding to the identified hierarchical-chained progression state; automatically predicting, based on the identified hierarchical-chained progression state and its one or more associated process flows, a likelihood that the at least one activity will reach the predictable result state corresponding to the identified hierarchical-chained progression state; and implementing, based on the automatically predicting, a control action for at least one of: the at least one activity, the identity, or a resource to which the identity is seeking to communicate.

According to a disclosed embodiment, the implementing of the control action may be performed before the at least one activity is able to reach the predictable result state corresponding to the identified hierarchical-chained progression state.

According to a disclosed embodiment, the implementing of the control action may be performed based on a determined time window that is associated with the identified hierarchical-chained progression state.

According to a disclosed embodiment, the plurality of hierarchical-chained progression states and their dynamically built constituent phases may be developed through a machine learning process.

According to a disclosed embodiment, the machine learning process may include observing a plurality of processes; identifying activities occurring within the plurality of processes, each of the activities having a corresponding time attribute; determining beginning states and result states for the plurality of processes; and associating the identified activities to the beginning states and result states.

According to a disclosed embodiment, the machine learning process may include determining probabilities, for points between the beginning states and result states, of the plurality of processes reaching the result states.

According to a disclosed embodiment, the implementing may include selecting from a plurality of particular control actions, each of the particular control actions being associated with one or more of the plurality of hierarchical-chained progression states.

According to a disclosed embodiment, the implementing may include determining a risk level for the at least one activity.

According to a disclosed embodiment, the implementing may include determining a risk level for the predictable result state corresponding to the identified hierarchical-chained progression state.

According to a disclosed embodiment, the predictable result state corresponding to the identified hierarchical-chained progression state may be determined to be potentially high-risk if it involves at least one of: a potential credential exploit, a potential secret exploit, a potential code injection, a potential critical access activity, a potential action by a privileged identity, or a potential data leakage.

According to another disclosed embodiment, a method may be implemented for developing predictions of sensitive states to be controlled in a computer network. The method may comprise identifying at least one activity associated with an identity in the computer network; accessing a plurality of hierarchical-chained progression states representing timelines defining one or more process flows for operations in the computer network between beginning states and corresponding predictable result states to be controlled; wherein the plurality of hierarchical-chained progression states are: dynamically configurable according to, at least in part, environmental attributes of the computer network, comprised of a plurality of dynamically built constituent phases, and associated with indications of potentially reaching one or more of the corresponding predictable result states; identifying a hierarchical-chained progression state from the plurality of hierarchical-chained progression states corresponding to the identified activity; wherein the identifying is performed independent of any indication of whether the at least one activity has resulted in a predictable result state corresponding to the identified hierarchical-chained progression state; automatically predicting, based on the identified hierarchical-chained progression state and its one or more associated process flows, a likelihood that the at least one activity will reach the predictable result state corresponding to the identified hierarchical-chained progression state; and implementing, based on the automatically predicting, a control action for at least one of: the at least one activity, the identity, or a resource to which the identity is seeking to communicate.

According to a disclosed embodiment, the control action may include at least one of: generating an alert identifying the at least one activity, generating an alert identifying the identity, limiting computing capabilities of the identity, blocking the at least one activity, or rotating a credential.

According to a disclosed embodiment, the plurality of dynamically built constituent phases may be dynamically adjustable based on changes to the one or more process flows.

According to a disclosed embodiment, the plurality of dynamically built constituent phases may be dynamically adjustable based on changes to the plurality of hierarchical-chained progression states.

According to a disclosed embodiment, the plurality of dynamically built constituent phases may be based on at least one of: a creation of a process, a command generated by the identity, data input by the identity, a DNS resolution request, or a DNS resolution completion.

According to a disclosed embodiment, the plurality of hierarchical-chained progression states may be developed through a machine learning process.

According to a disclosed embodiment, the machine learning process may include gathering the environmental attributes of the computer network.

According to a disclosed embodiment, the environmental attributes of the computer network may be gathered from a plurality of endpoint computing devices.

According to a disclosed embodiment, the environmental attributes of the computer network may be gathered from a proxy resource in communication with a plurality of endpoint computing devices.

According to a disclosed embodiment, the environmental attributes of the computer network may be analyzed through the machine learning process in a test environment separate from a live environment of the computer network.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
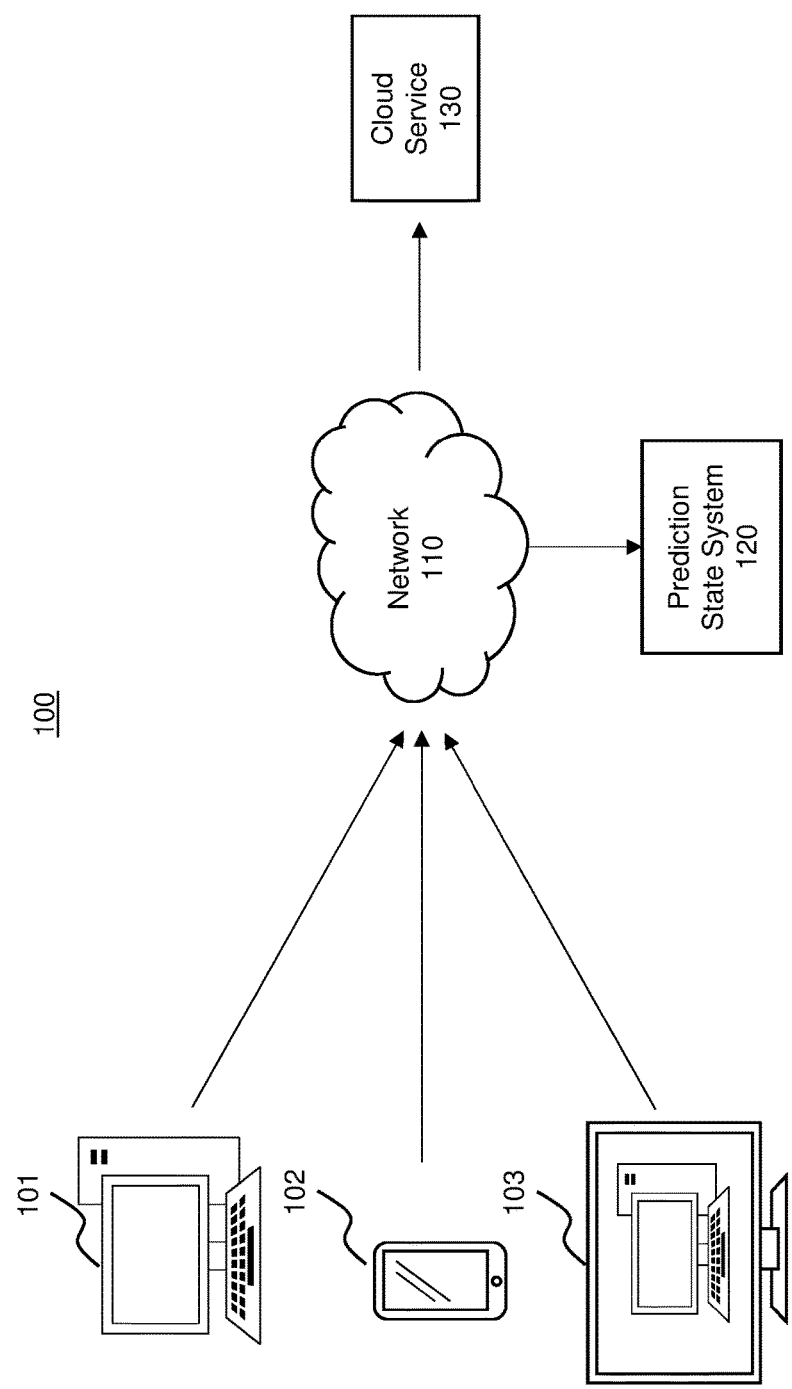
FIG. 1 is a block diagram of an exemplary system for predictable detection in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of predictable detection described herein overcome several technological problems in the fields of cybersecurity and network communications. As discussed below, the disclosed embodiments provide techniques to predict sensitive, suspicious, or irregular actions before they occur. The systems and methods described herein may include gathering information and attributes from a computer network environment and then, using machine learning algorithms or other techniques, building a timeline identifying a cause and effect relationship between the attributes and initial and result states. This may include grouping the attributes into subphases and then into a number of hierarchal-chained progression states between the initial state and the result state to be predicted. Each hierarchal-chained progression state may represent a step or multiple steps that occur between the initial state and the result state. Using the disclosed techniques, the occurrence of a particular result state can be predicted based on detection of activities associated with attributes in the timeline. This allows a particular event to be predicted ahead of time so that a control action can be taken to prevent or mitigate the event. Further, through the use of multiple hierarchal-chained progression states, the system can take different control actions based on how far the activity or process flow has progressed. For example, a control action may be different if the event is detected in early stages rather than further along the process. Further, even if the resulting activity is detected as it occurs, the system can respond immediately. In existing solutions where a cloud log is monitored to detect activities, for example, there is often an inherent delay that would further delay the responsive action.

While there are a number of potential uses for this technique, one example may be predicting a cloud activity before it occurs. By detecting the steps that occur along the process, for example, steps taken by an endpoint client device, the disclosed systems and methods allow for detection of the activity before it occurs. Example activities to be predicted include cloud activity by human users through a web console, suspicious code injection, critical access to a privileged target resource, or an application performing actions through Cloud Application Programming Interface (Cloud API) calls, among various other types of activities.

Reference will now be made in detail to the disclosed embodiments, examples of which are illustrated in the accompanying drawings.

FIG. 1 is a block diagram of an exemplary computing network 100 for predictable detection in accordance with disclosed embodiments. As shown, computing network 100 may include one or more source endpoints, such as client identities 101, 102, and 103, in communication with a prediction state system 120. The client identities 101-103 may include, for example, a computer device 101, such as a desktop or laptop computer. The client identity may also be a mobile device 102 such as a mobile phone or tablet. The client identity may also include a virtual machine 103 (e.g., virtualized computer, container instance, serverless code, etc.). The client identity 101-103 may also be an application in communication with a cloud service (e.g., computer applications, scripts, code segments, operating systems, mobile applications, or web applications, etc.). The client identity 101-103 may also be a number of other devices, including wearable devices (smart watches, smart jewelry, implantable devices, fitness trackers, smart clothing, or head-mounted displays, etc.) or IoT devices (e.g., smart home devices, industrial devices, etc.) in communication with a cloud service 130. While the present disclosure provides examples of client endpoints 101-103, it should be noted that aspects of the disclosure, in their broadest sense, are not limited to these examples and authentication may be provided for various types of client identities.

Computing network 100 may also include a cloud service 130, as shown in FIG. 1. Cloud service 130 may include a variety of cloud computing services provisioned by various cloud vendors. For example, cloud service 130 may be a software application service, such as a Software as a Service (SaaS) system. Cloud service 130 may also be a Platform as a Service (PaaS), or Infrastructure as a Service (IaaS) system. Cloud service 130, for example, may be based on infrastructure of services of Amazon Web Services™ (AWS), Microsoft Azure™, Google Cloud Platform™, Cisco Metapod™, Joyent™, vmWare™, or other cloud computing providers. While the present disclosure provides examples of cloud services, it should be noted that aspects of the disclosure in their broadest sense, are not limited to any particular type of endpoint resource. For example, cloud service 103 may be a remote file server or other endpoint resource in a distributed computing network.

Client identities, such as 101, 102, and 103, may communicate with cloud service 130 through network 110. Such communications may take place across various types of networks 110, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, a private data network, a virtual private network using a public network, a nearfield communications technique (e.g., Bluetooth, infrared, etc.), or various other types of network communications. In some embodiments, the communications may take place across two or more of these forms of networks and protocols.

Computing network 100 may also include a prediction state system 120, as shown in FIG. 1. Prediction state system 120 may be configured to predict sensitive or possibly suspicious or irregular actions before they occur and take necessary control actions. Prediction state system 120 may also monitor various communications and actions within computing network 100. For example, prediction state system 120 may monitor actions or processes occurring at an endpoint, such as client identities 101, 102, or 103. Prediction state system 120 may also monitor communications between client identities 101, 102, and 103 and cloud service 130. Prediction state system 120 may be configured to generate hierarchical-chained progression states and timelines representing process flows for operations in the computer network. Prediction state system 120 may also be configured to predict a likelihood that an activity will reach a predictable result state and implement a control action in response to the prediction. Prediction state system 120 may be configured to implement processes 500 and 600 described below.

Figure 2:
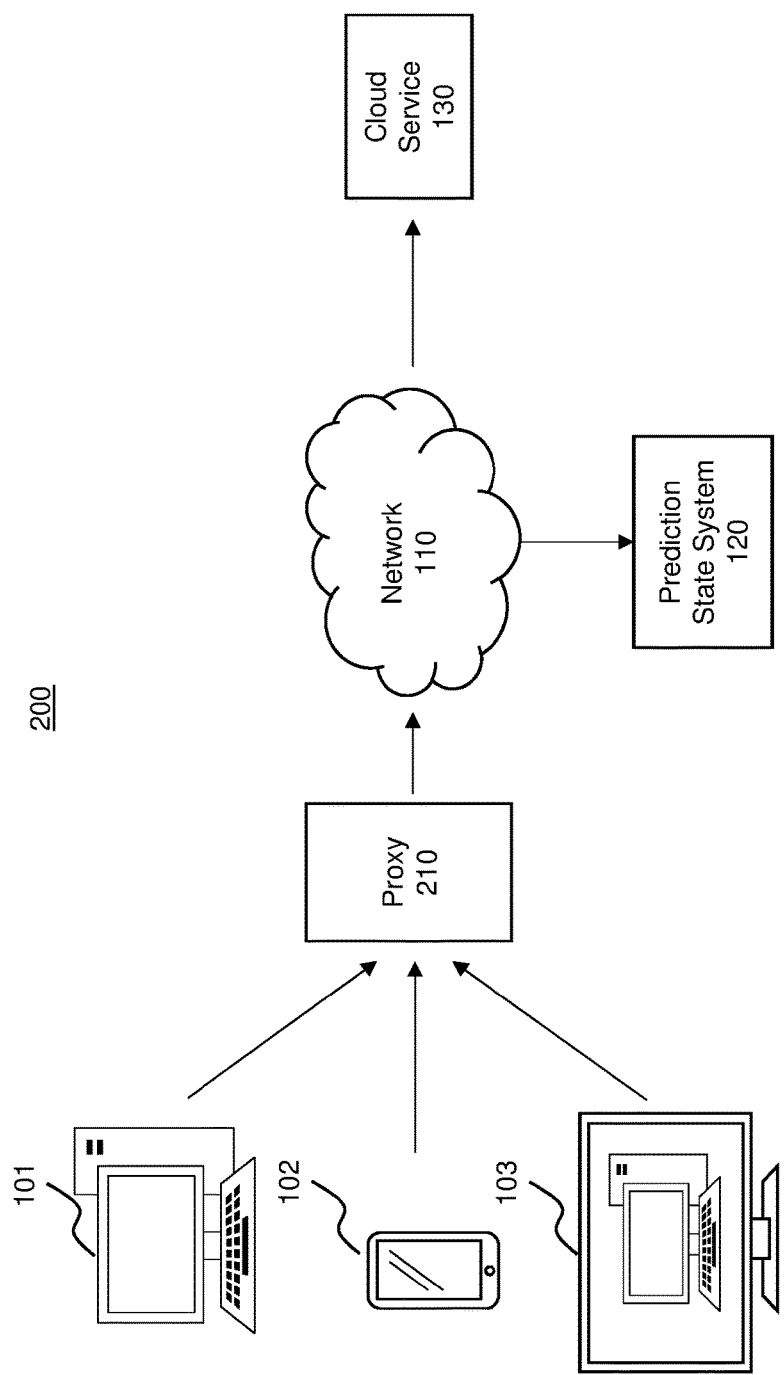
FIG. 2 is a block diagram of an exemplary system for predictable detection including a proxy server or agent in accordance with disclosed embodiments.

Computing network 100 may include a variety of other components not depicted in FIG. 1. For example, FIG. 2 shows an alternative computing network 200 for predictable detection including a proxy server or agent 210. Computing network 200 is the same as computing network 100, with the exception that proxy server or agent 210 is configured to act as an intermediary between client identities 101, 102, and 103 and network 110. For example, proxy server or agent 210 may be a gateway or tunneling proxy that passes unmodified requests through network 110 to cloud services 130. Proxy server or agent 120 may also perform various other functions, such as encryption, load balancing, filtering, caching, or any other known processes. In some embodiments, a proxy server 210 may be physically separate from client identities 101-103, while in other embodiments, a proxy agent 210 may be integrated into client identities 101-103.

While prediction state system 120 is shown as standalone system in FIGS. 1 and 2, it should be understood that prediction state system 120 may be implemented in a variety of ways. For example, prediction state system 120 may be a separate system configured to monitor activities within the computing networks of computing network 110. In this embodiment, prediction state system 120 may include dedicated components such as a memory, processor, server, operating system, etc. for carrying out the processes described below. Prediction state system 120 may operate as a service within the network 110 for providing predictable detection and may be configured to connect and interact with endpoint computing devices, such as client identities 101, 102 and 103, over a network connection.

In other embodiments, prediction state system 120 may be deployed on various other elements of computing network 100. For example, prediction state system 120 may be deployed on a source endpoint, such as client identities 101, 102, or 103. Prediction state system 120 may be an agent or executable software application running within an operating system or application of client identity 101, 102, or 103. Prediction state system 120 may monitor and/or intercept actions or commands that occur within the client identity or client computing device 101-103. Prediction state system 120 may also be deployed on a target endpoint resource, such as cloud service 130. In other embodiments, prediction state system 120 may be deployed on a proxy server, such as proxy server 210.

Figure 3:
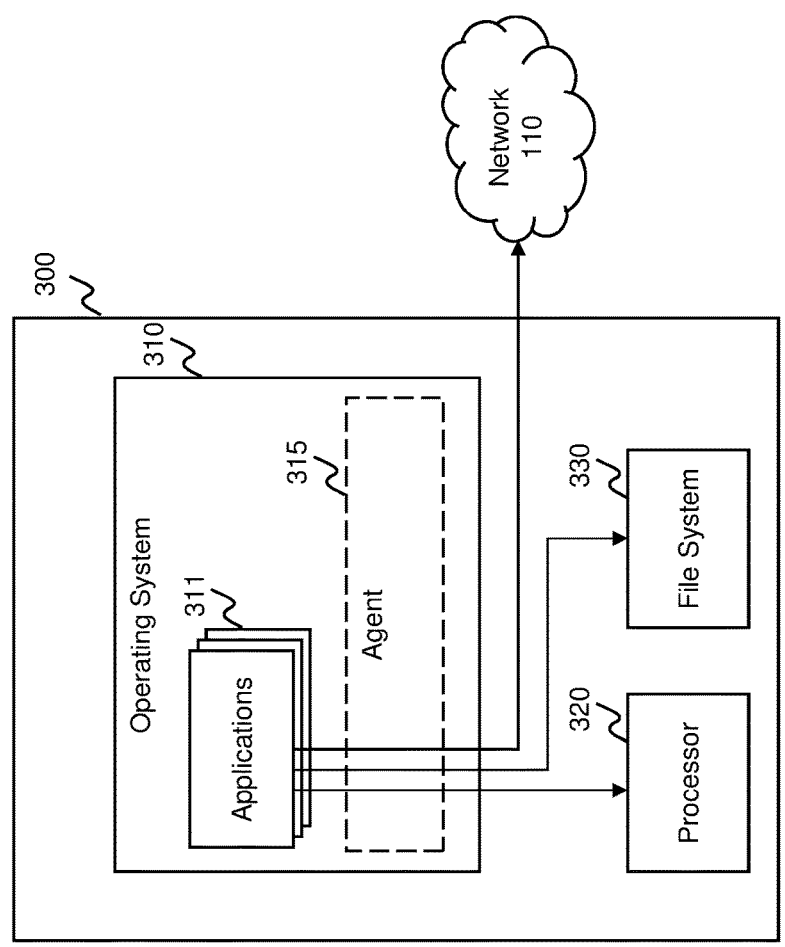
FIG. 3 is an exemplary illustration of an endpoint client device with a prediction state system agent, in accordance with disclosed embodiments.

FIG. 3 is an exemplary illustration of a client device 300 and its components, consistent with the disclosed embodiments. Client device 300 may be, for example, any of the source endpoints described in relation to FIG. 1, such as client identities 101, 102 or 103. Client device 300 may communicate with endpoint resources, such as cloud system 130 via network 110, as shown in FIG. 1.

As illustrated in FIG. 3, client device 300 may include an operating system 310, a processor 320, and a file system 330. It is understood that client device 300 may not include all of the features shown in FIG. 3 or may include additional features not shown. Client device 300 may be configured such that operating system 310 includes one or more applications 311 running on operating system 310. Applications 311 may include a variety of different types or forms of software applications. Applications 311 may include, for example, email programs (e.g., Gmail™, Microsoft Outlook™), messaging applications (e.g., iMessage™, WhatsApp™ Telegram™, Skype™, Line™, etc.), social media applications (e.g., Facebook™ Instagram™, Twitter™, etc.), web browsers (Google Chrome™, Internet Explorer™' etc.), business applications (e.g., Office™ programs, database programs, company intranet pages, etc.), or various other types of applications running on client device 300. Applications 311 may be configured to perform various actions and/or send commands to various other components of client device 300 or computing networks 100 or 200. For example, applications 311 may send a command to processor 320, as shown in FIG. 3. Applications 311 may also send a request or various other commands to network 110. These requests may be intercepted or sent initially to an intermediate device, such as proxy server 210. Applications 311 may also perform various actions on file system 330 or other components of client device 300.

Client device 300 may include an agent 315 running as part of the operating system on client device 300, as shown in FIG. 3. Agent 315 may be configured to perform various functions to carry out predictable detection in accordance with the disclosed embodiments. Agent 315, for example, may be prediction state system 120, or an agent thereof, deployed on client device 300. In some embodiments, agent 315 may be installed on operating system 310 by a driver. Agent 315 may be configured to intercept and/or monitor actions and commands that are being sent to processor 320, file system 330 or network 110. Agent 315 may include a number of "hooks" within the operating system and/or applications to facilitate intercepting or monitoring actions and commands. Agent 315 may further be enabled with a high level of privileges (e.g., root privileges, superuser privileges, administrator privileges, etc.) to access all resources of client device 300.

In accordance with the disclosed embodiments, agent 315 may gather data about the system environment (e.g., the client device, the network, the cloud service, etc.) necessary to build timelines and/or progression states used for developing predictions of sensitive states in the computer network. This data may include attributes such as the creation and termination of processes, commands that were inserted to a system shell, key presses made by a user of client device 300, drivers and/or modules that were loaded and linked to processes, network indicators (e.g., open connections, new network sockets, and their IPs and ports), system performance indicators, installed software, filesystem information (e.g., directory changes, file modification, file names), DNS resolutions made by the host, browsers' surfing data (e.g., URL addresses being viewed, browsing history, bookmarks, downloaded new files, etc.), development tools and IDEs (e.g., Visual Studio™, Java™ SDK, Python™ installation, etc.), or captured screenshots of the source host. While various attributes are disclosed above, it is understood that numerous other types of data or information may be collected, depending on the application.

Agent 315 may also be configured to record a time associated with each of the detected attributes. The attribute data and the associated time data (e.g., from a processor clock, operating system clock, an external clock, etc.) may be used to build a timeline of the attributes associated with a particular result state. A result state may be a particular occurrence or event that the system may attempt to predict. A result state may include, for example, a cloud action was made, credentials being stolen from a target domain controller, a code injection being made to a privileged process, critical access to a privileged resource being executed, a privileged entity being created or deleted, etc. While particular examples of result states are provided, it is understood that the disclosed embodiments are not limited to any particular result state.

Figure 4:
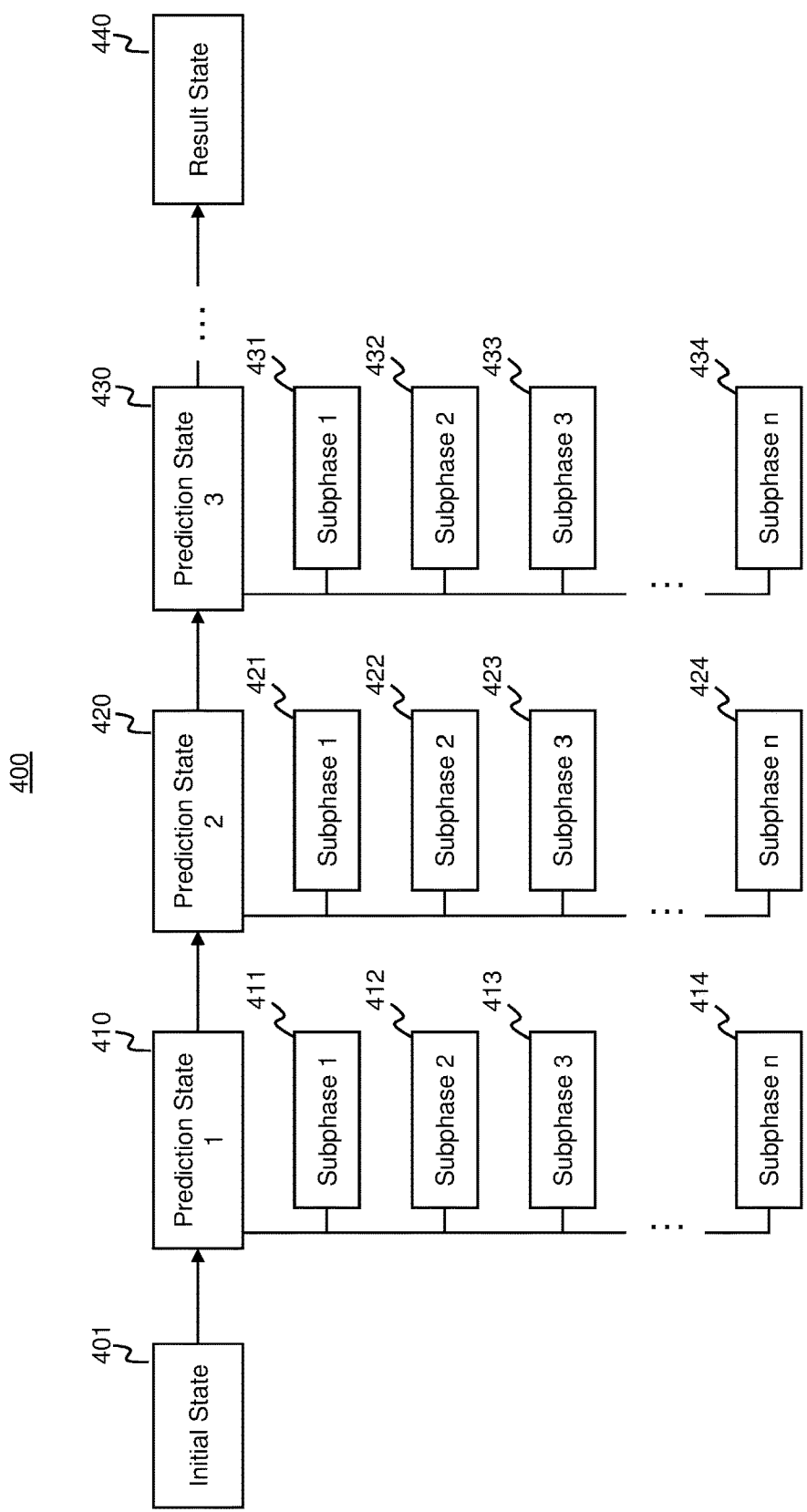
FIG. 4 is an exemplary illustration showing hierarchal chained progression states, in accordance with disclosed embodiments.

Agent 315 may observe various occurrences of the result state to determine which attributes and data are relevant to prediction of the occurrence. Agent 315 may group the attributes into subphases and group the subphases into progression states. For example, agent 315 may be configured to generate a hierarchal-chained progression state timeline as shown in FIG. 4, described in detail below. Agent 315 may use a machine learning technique in order to develop the progression state timeline. It is understood that the progression state timeline may be developed by agent 315, or may be developed by a separate component in the system. For example, agent 315 may intercept commands and actions within client device 300 and send attribute data to a prediction state system being executed elsewhere within the network, such as on a proxy server or in the network. Agent 315 may further be configured to predict the occurrence of a result state based on the hierarchal prediction state timeline and take a necessary control action.

It is understood that FIG. 3 is provided by way of example only. Client device 300 or the client identities as shown in FIG. 1 may not include agent 315. The steps described above may be performed by a prediction state system deployed in other areas of the system, as described above.

FIG. 4 shows an exemplary hierarchal progression state timeline 400, in accordance with disclosed embodiments. As shown, hierarchal progression state timeline 400 may include a number of states, including an initial state 401, a number of progression states 410, 420, and 430, and a result state 440. While in some embodiments result state 440 is a final or ending state of timeline 400, in other embodiments it is not, and the process being mapped in timeline 400 may continue beyond result state 44. Initial state 401 may be a state of the system before any actions or attributes associated with result state 440 have occurred, or may be the first action in a process. Hierarchal progression state timeline 400 may be used to predict the occurrence of a result state, for example, as described in process 700, below. Hierarchal progression state timeline 400 may be generated by a prediction state system, such as agent 315, according to process 500.

Progression states 1, 2, and 3 (410, 420, and 430) may consist of a number of subphases. Prediction state 1 (410), for example, may include subphases 1, 2, 3, and n (411, 412, 413, and 414), as shown in FIG. 4. The number of progression states and the number of subphases of each prediction state may vary depending on the gathered attributes or the process flow leading up to the result state 440.

Each subphase may include a number of attributes associated with result state 440. These attributes may include the attributes collected and determined by agent 315, described above. The subphases may be dynamically determined with respect to a variety of different attributes, such as the number and type of processes that are performed at a particular subphase. As described above, exemplary attributes may include the creation and termination of processes, commands that were inserted to a system shell, key presses or other inputs made by a user, drivers and/or modules that were loaded and linked to processes, network indicators (e.g., open connections, new network sockets, and their IPs and ports, etc.), system performance indicators, installed software, filesystem information (e.g., directory changes, file modification, file names, etc.), DNS resolutions made by the host, browsers' surfing data (e.g., URL addresses being viewed, browsing history, bookmarks, downloaded new files, etc.), development tools and IDEs (e.g., Visual Studio™, Java™ SDK, Python™ installation, etc.), or captured screenshots of the source host. These attributes may be identified, for example, in process 500.

Each subphase may be grouped under a hierarchal progression state (410, 420, and 430). Each progression state may represent a different phase leading to the occurrence of result state 440. Progression states 410, 420, and 430 may represent the general steps required by a user or other identity to achieve a particular result. For example, if a user is attempting to log in to a restricted service, the general steps may include logging in to the client device, entering privileged credentials, sending the credentials to the target resource, validation of the credentials by the resource, and transmission of an approval to the user. Each of these steps may represent a separate progression state within hierarchal progression state timeline 400 and each progression state may include a number of corresponding detected attributes associated with that step.

Figure 5:
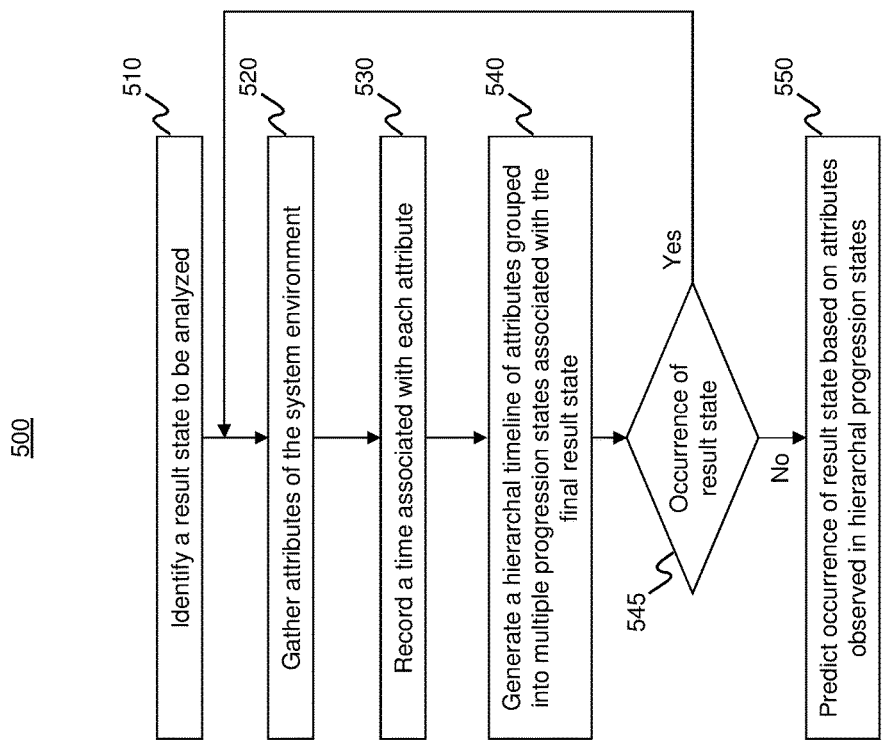
FIG. 5 is a flowchart depicting an exemplary process for generating a hierarchal chained progression state timeline, in accordance with disclosed embodiments.

FIG. 5 is a flowchart depicting an exemplary process 500 for generating a hierarchal-chained progression state timeline, in accordance with disclosed embodiments. Process 500 may be performed by a prediction state system 120, as shown in FIGS. 1 and 2. As described above, prediction state system 120 may be deployed in network 110, in an endpoint client device, such as client identities 101, 102, or 103, on a proxy server, such as proxy 210, on an endpoint cloud service, such as cloud service 130, or through various other embodiments. Some or all of the steps of process 500 may be performed by an agent of the prediction state system, such as agent 315, running on an endpoint, proxy, or other component in the network.

In step 510, process 500 may include identifying a result state to be analyzed. A result state may be identified according to process 500 in a variety of ways. In some embodiments, a result state maybe provided as part of a request or query. For example, an administrator or other entity within the system may request that a hierarchal timeline be developed to predict a particular event. In other embodiments, the system could be configured manually with predefined result states.

In step 520, process 500 may include gathering attributes of the system environment. For example, step 520 may include gathering attributes of computing network 100 or 200 by prediction state system 120. This may include intercepting commands or actions carried out by an endpoint client device, such as client identities 101, 102 or 103, including commands sent to processor 320, to file system 330, or to network 110. In some embodiments, the attributes may be gathered from a target endpoint, such as cloud service 130. The attributes may be gathered, for example, from logs (e.g. AWS CloudWatch) maintained by the target resource. Alternatively, the attributes can be gathered from a proxy or other components within the network. The attributes may be collected and analyzed locally by an installed agent on a client device, or queried remotely, for example, by an outside system. As described above, the attributes may include, for example, the creation and termination of processes, commands that were inserted to a system shell, key presses made by a user of client device 300, drivers and/or modules that were loaded and linked to processes, network indicators (e.g., open connections, new network sockets, and their IPs and ports, etc.), system performance indicators, installed software, filesystem information (e.g., directory changes, file modification, file names, etc.), DNS resolutions made by the host, browsers' surfing data (e.g., URL addresses being viewed, browsing history, bookmarks, downloaded new files, etc.), development tools and IDEs (e.g., Visual Studio™, Java™ SDK, Python™ installation, etc.), or captured screenshots of the source host.

In step 530, process 500 may include recording a time of occurrence for each attribute. The time of occurrence for the attributes may be obtained in various ways. Step 530, for example, may involve extracting a time of occurrence from metadata associated with a particular file, command, or action. Step 530 may also include accessing a log of events and extracting timestamps associated with particular log entries. Step 530 could also involve observing a particular attribute and recording the time of occurrence as the event occurs (e.g., from a clock, as discussed above). This time information may be used to develop a timeline of attributes associated with a particular result state.

In step 540, process 500 may include generating a hierarchal timeline of attributes grouped in multiple progression states associated with the final result state. Step 540 may, for example, generate a timeline such as hierarchal progression state timeline 400 as shown in FIG. 4. In step 540, all attributes gathered in step 520 may be divided into subphases and then into multiple progression states. As described above, each of the subphases may be dynamically built to include various attributes. Step 540 may also include grouping each subphase under a progression state, such as progression states 410, 420, and 430 as shown in FIG. 4. Each progression state may represent a general step along a progression of states leading to a result state. In some embodiments, a system performing process 500 may be configured with predefined progression states and step 540 may involve populating the timeline with the attributes and occurrence times identified above.

A system performing step 540 may observe or gather information about a number of occurrences of a result state and build cause and effect relationships between different attributes and progression states based on the progression state. For example, if each time a specific result state occurs, and the same events occur in the same order, the system may determine attributes associated with those steps are important and include them into the hierarchal timeline. Step 540 may further involve the use of machine learning algorithms to generate the hierarchal timeline of attributes. Accordingly, step 540 may involve using a machine learning algorithm, such as linear regression, logistic regression, random forest, k-nearest neighbor (KNN), K-Means, decision tree, Naïve Bayes, Support Vector Machines (SVM), neural networks, or gradient boosting algorithms. Step 540 may involve a supervised learning approach, in which the hierarchal timeline is developed using a training process. Step 540 may also develop the hierarchal timeline using an unsupervised or reinforcement machine learning process, where manual training is not required.

Process 500 may also be an iterative process in which one or more of the steps described above may be repeated upon new occurrences of the result state. Accordingly, process 500 may include an additional step 545 triggered by the occurrence of the result state. As the result state occurs, any of the previous steps of process 500 relative to that result state may be performed again to refine the hierarchal timeline generated in step 540. For example, if process 500 involves a machine learning algorithm, process 500 may include gathering attributes, recording occurrence times of the attributes, and refining the hierarchal timeline each time the result state occurs. This process may improve the accuracy of the hierarchal progression state timeline and allow for better prediction of the result state. A system implementing process 500 may be configured to continuously monitor and learn the environment and improve the progression states and probability scores associated with the prediction states.

In step 550, process 500 may include predicting an occurrence of the result state based on attributes observed in hierarchal progression states. For example, when a system detects one or more attributes identified within the hierarchal progression state timeline, the system may be able to predict the occurrence of the result state before it occurs and take some control action based on the prediction. An example prediction process is provided in further detail below in process 600.

Figure 6:
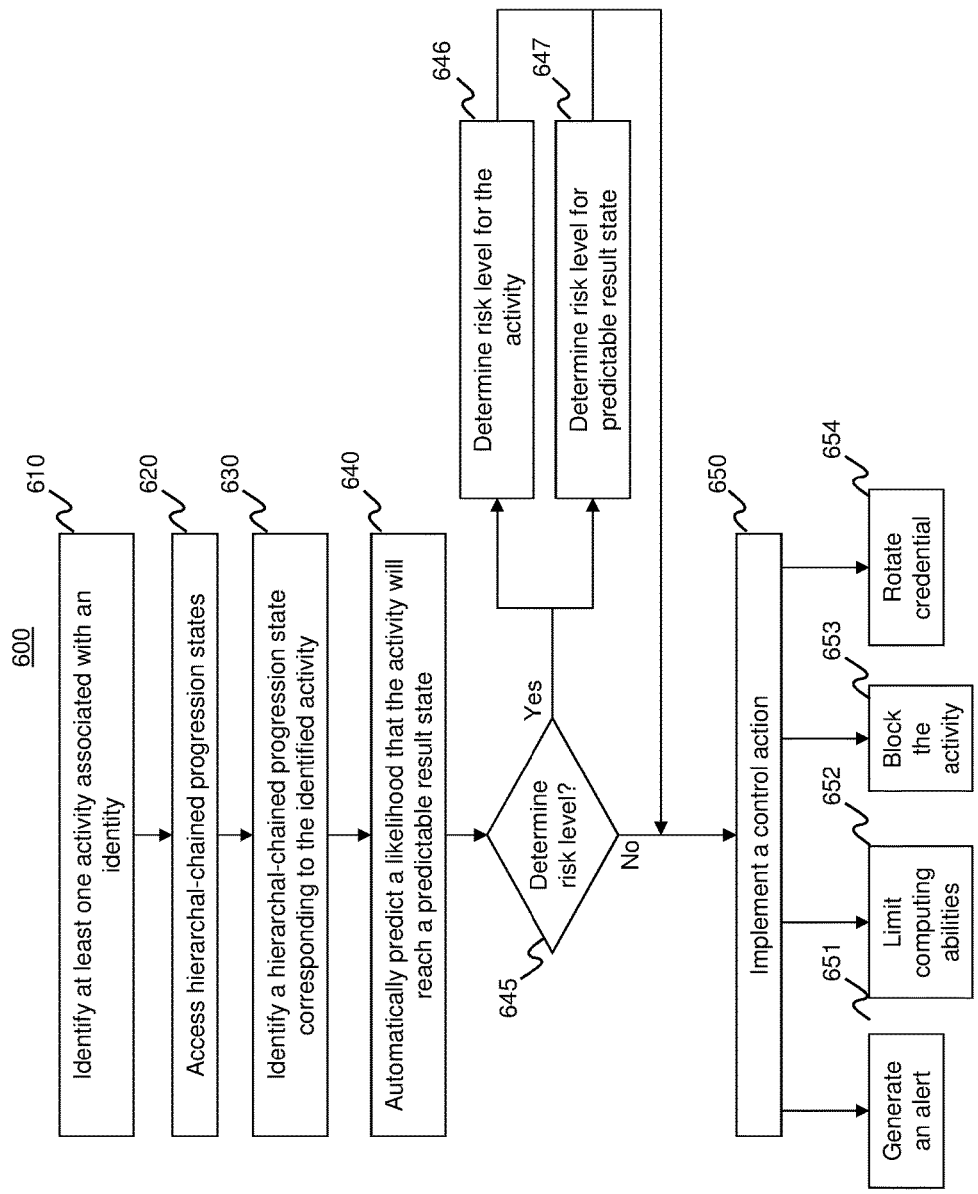
FIG. 6 is a flowchart depicting an exemplary process for developing predictions of sensitive states to be controlled in a computer network, in accordance with disclosed embodiments.

FIG. 6 is a flowchart depicting an exemplary process 600 for predicting sensitive states to be controlled in a computer network, in accordance with disclosed embodiments. Process 600 may allow a system to predictably detect a result state prior to its occurrence, using a hierarchal-chained progression state timeline, and implement a control response. Process 600 may be performed by prediction state system 120, as shown in FIGS. 1 and 2, or an agent of the system.

In step 610, process 600 may include identifying at least one activity associated with an identity (e.g., application, account, or human). The identity may be a variety of different types of entities or devices within a computing network. For example, the identity may be client identities 101, 102, or 103 as shown in FIGS. 1 and 2. The identity may be another type of source endpoint or client device, as described above with respect to computing network 100. The activity may include some action taken by the identity, such as providing login credentials to access a resource. The activity may also be performed by a system or device other than the identity itself. For example, the activity may be a separate file server performing steps to validate the credentials submitted by the identity. The activity may be associated with an attribute, such as the attributes gathered in process 500, as described above. These examples are provided for illustration purposes only and the activity is not limited in any way by these examples.

In step 620, process 600 may include accessing hierarchal-chained progression states. The hierarchal-chained progression states may define one or more process flows for operations in the computer network between beginning states and corresponding predictable result states to be monitored and/or controlled. For example, the hierarchal-chained progression states may be progression states (410, 420, and 430), as shown in FIG. 4, and may be developed according to process 500. The hierarchal-chained progression states may be associated with indications of potentially reaching one or more for the corresponding predictable result states. For example, the hierarchal-chained progression states may represent a series of stages or phases between an initial state and the predictable result state. The hierarchal-chained progression states may also be configurable based on environmental attributes of the computer network (e.g., based on a network directory such as Active Directory™, types of client identities involved in the network, applications installed on client identities, communications activity in the network, geographic locations of client identities, etc.).

As described above, the hierarchal-chained progression states may comprise of one or more dynamically built constituent phases, such as the subphases shown in FIG. 4. The constituent phases may consist of one or more attributes, such as those gathered according to process 500. A constituent phase may be based on, for example, a creation of a process, a command generated by an identity, data input by an identity, a DNS resolution request, or a DNS resolution completion. The constituent phases may also be dynamically adjustable during operation of the network, for example, based on changes to a process flow associated with a particular result state or changes to the hierarchal-chained progression states.

As described above with respect to process 500, the hierarchal-chained progression states, and the dynamically built constituent phases, may be developed through a machine learning process. For example, the hierarchal-chained progression states and constituent phases may be developed using a machine learning algorithm, such as linear regression, logistic regression, random forest, k-nearest neighbor (KNN), K-Means, decision tree, Naïve Bayes, Support Vector Machines (SVM), neural networks, or gradient boosting algorithms. In some embodiments, a machine learning technique may involve observing a plurality of processes. The machine learning technique may identify a number of activities occurring within the plurality of processes and record a corresponding time attribute. This may include gathering environmental attributes of the computer network from a number of endpoint devices in the network. The environmental attributes can be gathered directly from the devices, or from a proxy resource in communication with the endpoint devices.

The machine learning algorithm may then determine a beginning or initial state and a result state for the plurality of processes. For example, the machine learning algorithm may determine initial state 401 and result state 440, as shown in FIG. 4. The machine learning algorithm may then analyze the identified activities and/or environmental attributes in relation to the beginning states and result states. In some embodiments, the environmental attributes may be analyzed in a test environment, separate from the live environment of the computer network.

The machine learning process may also determine probabilities of the process reaching the result state for various points between the beginning states and result states. For example, the machine learning process may observe or gather data on the occurrence of a number of result states. The machine learning process may then analyze attributes and times associated with those attributes to determine a probability that a particular attribute or hierarchal-chained progression state will result in the associated result state.

In step 630, process 600 may include identifying a hierarchal-chained progression state corresponding to the identified activity. For example, if the activity is associate with a particular attribute or a particular constituent phase, step 630 may involve identifying the hierarchal-chained progression state where that attribute or constituent phase is included, or where a number of attributes or constituted phases are included.

In step 640, process 600 may include automatically predicting a likelihood that the activity will reach a predictable result state. For example, under step 640, process 600 may involve utilizing the hierarchal-chained progression state identified in step 630 to predict a likelihood of reaching the result state. Step 640 may predict a likelihood of reaching the result state based on previous occurrences of the activity, or attributes associated with the activity, previous occurrences of a constituent phase associated with the activity or previous occurrences of the hierarchal-chained progression state. In embodiments where a machine learning process is used to generate the hierarchal-chained progression states, step 640 may use probabilities of the process reaching the result state for various points between the beginning states and result states previously identified in the machine learning process.

Process 600 may also, in some embodiments, involve sub-step 645, of considering whether to determine a risk level. In particular, according to some embodiments process 600 may involve determining a risk level associated with the activity (step 646) and/or the predictable result state (step 647). If a risk level is to be determined, in step 646, process 600 may include determining a risk level for the activity identified in step 610. This may include, for example, determining the risk that a particular activity poses to an organization, an endpoint resource, or other entity associated with the system. This risk level may be based on, for example, the probability the activity will result in a predictable result state, the predicted time between the activity and the result state, the remaining steps or processes between the activity and the result state, or the level of harm associated with the result state. In some embodiments, two or more of these factors (e.g., probability and level of harm) are used to develop the risk level.

In step 647, process 600 may also include determining a risk level for the predictable result state. This may include a risk that an occurrence of the result state would pose to an organization, an endpoint resource, or other entity associated with the system. This may be based on, for example, a type of result state, a severity of harm the result state would impose, the irreversibility of the result state, the probability of reaching the result state, or various other factors, as well as combinations of the foregoing. A predictable result state may be considered high risk, for example, if it involves a potential credential exploit, a potential secret exploit, a potential code injection, a potential critical access activity, a potential action by a privileged identity, a potential data leakage, or various other potentially damaging scenarios. It is understood that process 600 may involve determining either or both of the risk levels of steps 646 and 647. Such risk levels may be expressed in a variety of ways (e.g., categories of risk, numerical levels or scores, colors, sounds, etc.).

In step 650, process 600 may include implementing a control action. The control action in step 650 may be implemented in response to the prediction in step 640, and/or the risk level from steps 646/647. For example, the control action may be implemented to prevent or limit the predictable result state or to mitigate or prevent harm associated with the result state. In some embodiments, the control action may be performed before the activity is able to reach or result in the predictable result state. For example, step 650 may include implementing a control action such as generating an alert 651 identifying the activity, generating an alert 651 identifying an identity associated with the activity, limiting computing capabilities 652 of the identity, blocking 653 the activity, or rotating a credential 654 associated with the identity. In other instances, the control action may be implemented responsive to occurrence of the activity.

The control action in step 650 may be implemented on the activity itself, the identity associated with the activity, a resource with which the identity is seeking to communicate, or various other features of the computer network. By way of example, if the activity involves a user entering a username, step 650 may involve investigating the user and/or changing the credentials associated with the user to prevent the user from causing a particular result state. The control action may also target the activity itself, such as blocking the user's credentials from being transmitted to the resource or terminating the browser used to enter the credentials. Alternatively, the control action may occur at the endpoint resource, such as blocking or interfering with an authentication process at the resource.

In some embodiments, a number of control actions might be associated with each hierarchical-chained progression state. Step 650 may include selecting from multiple control actions associated with the hierarchical-chained progression state identified. Because each progression state may have its own control action, step 650 can implement a targeted response to the particular activity or associated hierarchical-chained progression state.

The control action may further be selected based on a policy or rule associated with the network. In some embodiments, a system implementing process 600 may include a work policy for managing desired actions of the system. Users, administrators, organizations, or other entities may define rules or policies defining how the system should operate. This may further include defining a plurality of operating modes of the system, with different rules or polices associated with each operating mode. These polices or rules may be used to determine which control action is implemented by the system in step 650. For example, a different control action may be selected based on the privileges of the user or a policy of a resource being targeted by the user. In other embodiments, the system may automatically build a recommended work policy. This may include recording and/or learning from past implementations of process 600 to define policies for future implementations. The system may also integrate a number of other factors in to building a recommended work policy, such as the various probabilities of the progression states used in a particular implementation, a comparison between different organizations, or various other factors.

In some embodiments, the control action may be associated with a particular time window. Step 650 may involve implementing the control action based on a determined time window associated with the identified hierarchical-chained progression state. For example, this may involve blocking or limiting the communications or computing capabilities of the identity for a determined time interval. Further, this may involve blocking or limiting the communications or computing capabilities of the identity until an administrator reviews the predicted likelihood and/or risk level, and permits the identity to resume communications in the network.

There are numerous potential uses for the techniques disclosed herein. In some embodiments, the systems and methods may be used in a cloud environment (e.g., based on AWS™, Azure™, IBM Cloud™), for example, to predict activity of a human user interacting with a cloud vendor through a web interface. The system may use process 500 to develop a hierarchal chained progression state timeline for predicting the activity by gathering information and/or environmental attributes of the cloud system and building multiple progression states to represent the process flow. For example, the process flow may involve the following steps:
1. The user opens a web browser.
2. The user navigates to the cloud login page.
3. The browser performs a DNS resolution for the cloud URL website and gets the website's IP address.
4. A connection is established with the IP address.
5. The login page of the cloud vendor is received by the endpoint and loaded and presented on the browser.
6. The user enters cloud login credentials.
7. The credentials are sent to the cloud website for validation.
8. After validation, the user is successfully logged in and the next web page is presented through the browser.
9. The user performs cloud actions through the cloud vendor's web GUI.

Each of these steps is represented by relevant attributes gathered by the system.

Next, the system may develop multiple hierarchal-chained progression states to represent the steps by grouping the attributes first into subphases, then into the multiple states. Example progression states may include:
State 0—No cloud traces (initial state).
State 1—Initiated cloud state: This state may include subphases or attributes such as: detecting DNS resolutions of cloud vendors, cloud URLs being entered into the browser, network connections being created to the IPs of cloud vendors, cloud-related directories being created, cloud tools and cloud's SDKs being downloaded to the computer, etc. A specific example could be a DNS request for Amazon Web Services (AWS)™ at www.aws.com.
State 2—Cloud-ready endpoint: This state may include subphases or attributes such as: cloud tools or SDKs being installed and ready for use, existing stored cloud credentials being discovered, checking browser history for previous interactions with cloud-hosted websites, etc. A specific example could be checking a browser for saved credentials for the AWS™ login page.
State 3—Cloud credentials are going to be used (prediction state): This state may include subphases or attributes such as: a cloud login web page being detected in the user's browser, or analysis of keystrokes and detection of cloud credentials being typed.
State 4—Cloud action occurs: This state may include subphases or attributes such as: a cloud responding to the action that was made, or the login web page of the cloud vendor being changed after successfully checking the user's credentials. A specific example could be intercepting a web page that comes after a successful login to AWS™ (e.g., "console.aws.amazon.com").

The system may then predict the occurrence of a result state consistent with process 600, as described above. The system may detect one or more of the attributes or subphases associated with the progression states to predict the result state. In response, the system may initiate a control action, which may be selected based on the particular progression state that has been detected. The selected control action may also vary based on policies or rules of the system. For example, if the user is on a restricted computer that is not authorized to access the cloud service, the system may block the DNS resolution request made by the user's browser in Step 1. The system may also block the browser from displaying the login page of the cloud service. Where the user or the computing device has semi-restricted access to the cloud service, the system may not take a control action until state 3. The system may block the credentials from being sent to the target login page, for example, by dropping packets associated with the user's session from the network interface of the user's computing device. The system may also terminate the browser and display a warning message. Finally, during state 4, the system may take actions in response to successful authentication at the cloud service. The system may terminate the browser to prevent further actions at the cloud or may trigger an additional credential check to verify the user. The additional credential check may involve sending an alert to the user and/or rotating the credentials of the user.

Figure 7:
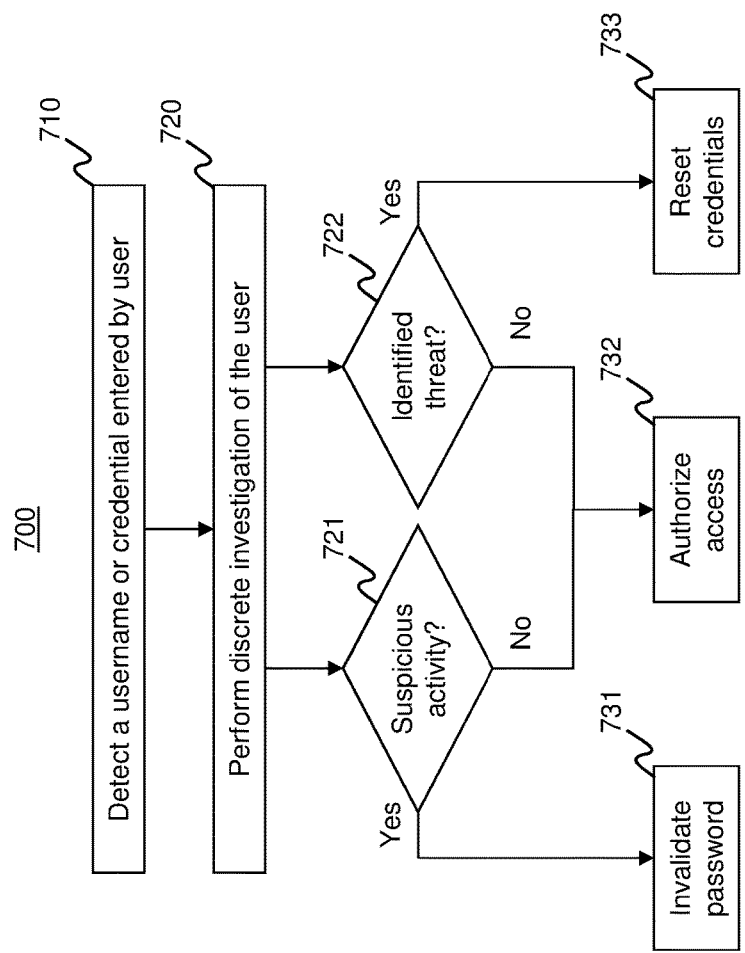
FIG. 7 is a flowchart depicting an exemplary process including a system response for a user entering a username, in accordance with disclosed embodiments.

FIG. 7 is a flowchart depicting an exemplary process 700 for responding to a user entering a username in accordance with disclosed embodiments. Process 700 may be implemented, for example, in response to a user attempting to access a restricted resource, such as the cloud service described in the example above.

In step 710, process 700 may include detecting a username or other login credential entered by a user. The credentials may be detected, for example, based on state 3 or state 4 in the previous example. For example, step 710 may include receiving a username alone, before a password or other credential associated with the user name is received.

In step 720, process 700 may include performing a discrete investigation of the user. Step 720 may include verifying credentials or other information about the user, such as an IP address, MAC address, account name, or other identifying information. Step 720 may also include determining permissions or access rights of the user, the user's historical access to the resource, the need for the user to access the resource, a frequency of access by the user, or various other considerations. For example, the system may verify the user against one or more policies of the cloud service, the system, or the network.

As a result of the investigation of step 720, the user or username activity may be identified as suspicious or potentially malicious in step 721. If the user or username activity is deemed suspicious, malicious, unauthorized, and/or invalid, process 700 may invalidate or rotate a current secret or other authentication information associated with the user or username in step 731. For example, a password associated with the user or user name may be rotated, rendering the password entered by the user invalid at the time of input. Therefore, a system using process 700 may initiate a check and take a control action instantly upon detecting a user name has been entered, without waiting for the user's password or other credentials to be entered and/or submitted. The user's activity may also be identified as a threat in step 722. In this case, process 700 may include resetting the user's credentials, for example, by disabling the user's credentials such that the user must sign in again. Alternatively, if the activity is not identified as suspicious or as a threat, the user's access may be granted, authorized, or authenticated in step 732.

Another possible use case of the disclosed embodiments may be detecting a suspicious code injection into a target process. As in the previous example, the prediction state system may gather information and/or environmental attributes of the cloud system to build multiple hierarchal-chained progression states to represent the process flow. The system may generate the progression states using process 500 and may utilize a machine learning process. In this case, the steps may include:

1. A privileged process is running on an endpoint.
2. An unrecognized executable file, script, or DII file is copied or downloaded to the endpoint.
3. The executable or script launches and opens a new process.
4. The newly created process sends system calls to the kernel.
5. The new process performs sensitive system calls and sends system calls to influence the target process in which it wants to inject code into. Sensitive system calls, such as an API call, may include functions such as: VirtualAllocEx, WriteProcessMemory, CreateRemoteThread, NtCreateThreadEx, RtlCreateUserThread, etc.
6. The memory of the target process is changed by an outside process.
7. The code is injected into the target process.
8. The target process is manipulated with the newly injected code residing in its memory.

The system may build hierarchal-chained progression states based on the gathered environmental attributes, as discussed above, to represent these steps. In this example, the system may generate progression states corresponding to each of the steps identified above. The system may identify an initial state 0 in which there is no suspicious code injection, no unfamiliar processes, and no unfamiliar executable file. Progression states 1-7 may correspond to steps 1-7 above, with step 8 being the predictable result state. The system may then predict the occurrence of the result state, as described in process 600. The system may identify an activity of the endpoint associated with one or more of the steps above. The system may then identify a corresponding hierarchal-chained progression state and implement a control action. The control action implemented by the system may vary based on the progression state identified and policies associated with the system or target resource. For example, when detecting progression state 3 the prediction state system (or an agent associated with the system) may send an alert that an unfamiliar process is being launched. The system may also terminate the process, depending on one or more policies in place. When detecting an initiation of the code injection in progression state 6, the prediction state system may restart the privileged process that is being manipulated. Upon detecting that the privileged process was compromised, as in state 8, the system may perform automated remediation steps. For example, the system may change the credentials used by the compromised process, thereby making the compromised process irrelevant because the credentials are no longer valid.

In another potential use case, the prediction state system may be configured to detect a critical access to a privileged target system resource. In one example, a user may delete a critical file remotely from a sensitive file server. As in the previous examples, the system may gather information and/or environmental attributes of the cloud system pertaining to the result state to be predicted. The system may generate hierarchal-chained progression states using process 500 and may utilize a machine learning process, as described above. In this example, there may be a number of preceding steps before the critical file is deleted, including:

1. A user logs in to a source endpoint.
2. The user opens a shell to the remote sensitive file server.
3. The user enters privileged credentials to authenticate itself the target privileged file server.
4. After entering the credentials, the user selects a next\ok button, and the credentials are sent to the target file server.
5. The file server receives the user's credentials and starts a validation process.
6. The file server validates the user's credentials and sends an approval and a continuous shell to the source endpoint.
7. The user receives an open shell to the target file server through which the user will perform actions on the files.
8. The user navigates through files and folders on the file server and selects a file to act upon.
9. The user sends a deletion command to the selected file.
10. The file server receives the deletion command and deletes the file.
11. The sensitive file on that privileged file server is deleted.

Again, each step is represented by relevant attributes that the system gathers from the network environment or the source endpoint. In generating the hierarchal-chained progression states, the prediction state system may divide these steps into multiple states. In one example, the system may identify a separate progression state for each of the steps 1-11 identified above. In other examples the system may identify more or fewer states.

The prediction state system may also be configured to predict the deletion of the critical file by the user, for example, using process 600. The system may implement a control action, which may be selected based on the hierarchal-chained progression state identified and/or policies associated with the system or network. For example, the system may detect the opening of a privileged shell to the sensitive file server, as in state 6, and may send an alert identifying the critical access or trigger additional authentication processes, such as multi-factor authentication. When the system detects navigation by the user to the sensitive file in state 8, the system may take preventative actions such as creating an undercover copy of the file before the user sends the actual deletion command. The system can then send an alert that the sensitive file has been deleted and the file can be restored either automatically or by administrators of the target file system.

In another potential use case of the disclosed embodiments, a prediction state system may detect cloud activity performed by a developed application through cloud API calls. There may be a number of steps involved in the process, including:

1. The endpoint downloads the cloud's SDK (Software Development Kit) required by the application to send commands to the cloud).

2. The cloud's SDK is installed on the local endpoint.
3. The cloud's SDK is imported to the integrated development platform (IDE).
4. A cloud application/script is developed.
5. Credentials are inserted into to the application.
6. The application/script is run.
7. Cloud actions are executed.
8. The cloud APIs are used.

The system may gather information and/or environmental attributes associated with the steps above. The system may generate hierarchal-chained progression states using process 500 utilizing a machine learning process. In some examples, the system may identify progression states corresponding to each of the steps above. The system may also generate fewer progression states, such as the states listed below:

State 0—No cloud actions predicted (initial state).

State 1 (steps 1-2 above): This state may include activities such as: surfing to a cloud vendor's development or documentation pages, creating cloud-associated directories and files, downloading cloud tools and cloud SDKs, etc. A specific example may include surfing to "aws.amazon.com/sdk-for-python/," or downloading the file AWSDKForNet_sdk.msi.

State 2 (steps 3-4 above): This state may include activities such as: opening the cloud tools locally, intercepting SDK configuration commands, initiating development tools and loading cloud API modules, etc. A specific example may be writing the command "import boto3" in developing a python script (boto3" being the AWS python module providing a python script to send API calls to the AWS cloud).

State 3 (step 5 above): Activity in this state may include inserting credentials into the application. Detection of this stage may include intercepting an AWS™ access key that was written inside the application's code. An AWS™ access key may be detected by a regular expression check or by checking for specific rules. For example, because AWS™ access keys always start with the string "AKIA" or "ASIA," the system may check for these expressions.

State 4 (steps 6-7 above): Detection of this state may include identifying that the python script was launched and the "boto3" AWS™ python module was loaded to the created process.

State 4 (step 8 above): The system may detect that a cloud action has been performed.

The prediction state system may be configured to predict the cloud action performed by the application, for example, using process 600. The system may implement a control action, which may be selected based on the hierarchal-chained progression state identified and/or policies associated with the system or network. In detecting progression state 1, the system may send an alert notifying access to the SDK, such as an alert to a security team or DevOps team, for example. Upon detecting state 3, the system may check to determine whether the inserted credentials are privileged. If the credentials are privileged, the system can generate an alert that notifying of a potential high-risk use of the credentials. Upon detecting state 5, where the cloud action has already occurred, the system can immediately trigger remediation steps, such as rotating the credentials used.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for developing predictions of sensitive states to be controlled in a computer network, the operations comprising:
   developing, through a machine learning process, a plurality of hierarchical-chained progression states representing timelines defining one or more process flows for operations in the computer network between beginning states and corresponding predictable result states to be controlled;
   identifying at least one computing activity executed on the computer network and being associated with an identity in the computer network;
   accessing, through the computing network, the plurality of hierarchical-chained progression states;
   wherein the plurality of hierarchical-chained progression states are:
      dynamically configurable according to, at least in part, environmental attributes of the computer network,
      comprised of a plurality of dynamically built constituent phases, and associated with indications of potentially reaching one or more of the corresponding predictable result states;
   identifying a hierarchical-chained progression state from the plurality of hierarchical-chained progression states corresponding to the identified computing activity;
   wherein the identifying is performed independent of any indication of whether the at least one computing activity has resulted in a predictable result state corresponding to the identified hierarchical-chained progression state;

automatically predicting, based on the identified hierarchical-chained progression state and its one or more associated process flows, a likelihood that the at least one computing activity will reach the predictable result state corresponding to the identified hierarchical-chained progression state; and implementing, based on the automatically predicting, a control action for at least one of: the at least one computing activity, the identity, or a resource to which the identity is seeking to communicate.

2. The non-transitory computer readable medium of claim 1, wherein the implementing of the control action is performed before the at least one computing activity is able to reach the predictable result state corresponding to the identified hierarchical-chained progression state.

3. The non-transitory computer readable medium of claim 1, wherein the implementing of the control action is performed based on a determined time window that is associated with the identified hierarchical-chained progression state.

4. The non-transitory computer readable medium of claim 1, wherein the dynamically built constituent phases are developed through the machine learning process.

5. The non-transitory computer readable medium of claim 1, wherein the machine learning process includes:
   observing a plurality of processes;
   identifying activities occurring within the plurality of processes, each of the activities having a corresponding time attribute;
   determining beginning states and result states for the plurality of processes; and
   associating the identified activities to the beginning states and result states.

6. The non-transitory computer readable medium of claim 5, wherein the machine learning process includes determining probabilities, for points between the beginning states and result states, of the plurality of processes reaching the result states.

7. The non-transitory computer readable medium of claim 1, wherein the implementing includes selecting from a plurality of particular control actions, each of the particular control actions being associated with one or more of the plurality of hierarchical-chained progression states.

8. The non-transitory computer readable medium of claim 1, wherein the implementing includes determining a risk level for the at least one computing activity.

9. The non-transitory computer readable medium of claim 1, wherein the implementing includes determining a risk level for the predictable result state corresponding to the identified hierarchical-chained progression state.

10. The non-transitory computer readable medium of claim 1, wherein the predictable result state corresponding to the identified hierarchical-chained progression state is determined to be potentially high-risk if it involves at least one of: a potential credential exploit, a potential secret exploit, a potential code injection, a potential critical access activity, a potential action by a privileged identity, or a potential data leakage.

11. A computer-implemented method for developing predictions of sensitive states to be controlled in a computer network, the method comprising:
   developing, through a machine learning process, a plurality of hierarchical-chained progression states representing timelines defining one or more process flows for operations in the computer network between beginning states and corresponding predictable result states to be controlled;
   identifying at least one computing activity executed on the computer network and being associated with an identity in the computer network;
   accessing, through the computing network, the plurality of hierarchical-chained progression states;
   wherein the plurality of hierarchical-chained progression states are:
      dynamically configurable according to, at least in part, environmental attributes of the computer network,
      comprised of a plurality of dynamically built constituent phases, and
      associated with indications of potentially reaching one or more of the corresponding predictable result states;
   identifying a hierarchical-chained progression state from the plurality of hierarchical-chained progression states corresponding to the identified computing activity;
   wherein the identifying is performed independent of any indication of whether the at least one computing activity has resulted in a predictable result state corresponding to the identified hierarchical-chained progression state;
   automatically predicting, based on the identified hierarchical-chained progression state and its one or more associated process flows, a likelihood that the at least one computing activity will reach the predictable result state corresponding to the identified hierarchical-chained progression state; and
   implementing, based on the automatically predicting, a control action for at least one of: the at least one computing activity, the identity, or a resource to which the identity is seeking to communicate.

12. The computer-implemented method of claim 11, wherein the control action includes at least one of: generating an alert identifying the at least one computing activity, generating an alert identifying the identity, limiting computing capabilities of the identity, blocking the at least one computing activity, or rotating a credential.

13. The computer-implemented method of claim 11, wherein the plurality of dynamically built constituent phases are dynamically adjustable based on changes to the one or more process flows.

14. The computer-implemented method of claim 11, wherein the plurality of dynamically built constituent phases are dynamically adjustable based on changes to the plurality of hierarchical-chained progression states.

15. The computer-implemented method of claim 11, wherein the plurality of dynamically built constituent phases are based on at least one of: a creation of a process, a command generated by the identity, data input by the identity, a DNS resolution request, or a DNS resolution completion.

16. The computer-implemented method of claim 11, wherein the machine learning process includes gathering the environmental attributes of the computer network.

17. The computer-implemented method of claim 16, wherein the environmental attributes of the computer network are gathered from a plurality of endpoint computing devices.

18. The computer-implemented method of claim 16, wherein the environmental attributes of the computer network are gathered from a proxy resource in communication with a plurality of endpoint computing devices.

19. The computer-implemented method of claim 16, wherein the environmental attributes of the computer network are analyzed through the machine learning process in a test environment separate from a live environment of the computer network.

* * * * *